United States Patent [19]
Clarisse et al.

[11] Patent Number: 5,885,711
[45] Date of Patent: Mar. 23, 1999

[54] ELECTRICALLY CONDUCTIVE POLYMER COMPOSITIONS, PRODUCTION PROCESS AND COATED SUBSTRATES

[75] Inventors: Christian Clarisse, Poisat; Didier Delabouglise; Jean Louis Ciprelli, both of Grenoble, all of France

[73] Assignee: France Telecom, France

[21] Appl. No.: 564,120

[22] PCT Filed: Mar. 30, 1995

[86] PCT No.: PCT/FR95/00406

§ 371 Date: Nov. 27, 1995

§ 102(e) Date: Nov. 27, 1995

[87] PCT Pub. No.: WO95/27289

PCT Pub. Date: Oct. 12, 1995

[30] Foreign Application Priority Data

Mar. 31, 1994 [FR] France .................................. 9403812

[51] Int. Cl.$^6$ ........................................................ B32B 5/16
[52] U.S. Cl. .......................................... 428/407; 427/222
[58] Field of Search ................................. 428/321, 403, 428/407; 528/455; 427/222

[56] References Cited

U.S. PATENT DOCUMENTS

| | | | |
|---|---|---|---|
| 4,568,483 | 2/1986 | Naarmann et al. | 252/500 |
| 4,617,228 | 10/1986 | Newman et al. | 428/265 |
| 4,731,311 | 3/1988 | Suzuki et al. | 429/213 |
| 4,795,687 | 1/1989 | Suzuki et al. | 429/213 |
| 5,422,423 | 6/1995 | Shacklette et al. | 528/422 |
| 5,549,851 | 8/1996 | Fukushima et al. | 252/519 |
| 5,552,216 | 9/1996 | Sugimoto et al. | 428/328 |
| 5,571,454 | 11/1996 | Chen et al. | 252/500 |

FOREIGN PATENT DOCUMENTS

| | | |
|---|---|---|
| 0089575 | of 0000 | European Pat. Off. . |
| 0097893 | of 0000 | European Pat. Off. . |
| 0399299A3 | of 0000 | European Pat. Off. . |

OTHER PUBLICATIONS

Wang, Yading, et al., "Stability Studies of the electrical conductivity of various poly(3-alkylthiophenes)", *Synthetic Metals*, 39:153–175 (1990).

*Primary Examiner*—Hoa T. Le
*Attorney, Agent, or Firm*—Fulbright & Jaworski L.L.P.

[57] ABSTRACT

Stable conductive polymer compositions which do not contain metal ions.

The compositions comprise at least one inherently conductive polymer or copolymer chosen from polythiophenes, polypyrroles, polyacetylenes, polyphenylenes, polythiophene copolymers, polypyrrole copolymers and their water-soluble derivatives, characterized in that the inherently conductive polymer is doped with an oxidizing compound chosen from the compounds of formulae:

R—NO and R—NO$_2$, in which R is chosen from the groups HSO$_4$, R$^1$SO$_3$ and (R$^1$SO$_2$)$_2$N, in which R$_1$ [sic] is chosen from linear or branched alkyl radicals having 1 to 10 atoms, preferably 1 to 4 carbon atoms, and linear or branched fluoroalkyl radicals having 1 to 10 carbon atoms, preferably 1 to 4 carbon atoms. Application in microelectronics.

14 Claims, 3 Drawing Sheets

ELECTRICALLY CONDUCTIVE POLYMER COMPOSITIONS, PRODUCTION PROCESS AND COATED SUBSTRATES

BACKGROUND OF THE INVENTION

The present invention relates generally to novel electrically conductive polymer compositions, to a process for producing these novel compositions, to substrates coated with a film formed from these novel compositions, and to oxidizing solutions for the production of these compositions.

Electrically conductive polymers and copolymers have proven in recent years to be materials which are particularly advantageous, on the one hand, in the field of microelectronics, especially in photolithographic processes, for example in order to improve electric charge flow, and on the other hand in electrochemistry, for example for the manufacture of rechargeable generators.

More specifically, in microelectronics, such materials are particularly useful for the manufacture of photosensitive conductive resins for processing by electron beam or deep ultraviolet, the manufacture of phase shift masks and conductive charge flow layers for examination by scanning electron microscope, or else plasma engraving. In electrochemistry, these materials are particularly suitable for the storage of electrochemical energy, the manufacture of antistatic conductive materials, and the applications of electrochromism.

Inherently conductive polymers and copolymers are known compounds, and among these polymers and copolymers there may be mentioned poly(thiophenes), polypyrroles, polyacetylenes, polyphenylenes, polythiophene-polypyrrole copolymers, and water-soluble derivatives thereof.

These inherently conductive polymers are generally doped with strong oxidizing compounds.

The compounds which are generally used for doping inherently conductive polymers and copolymers are arsenic pentafluoride ($AsF_5$), ferric chloride ($FeCl_3$), nitrosyl tetrafluoroborate ($NOBF_4$), nitrosyl hexafluorophosphate ($NOPF_6$), auric chloride ($AuCl_3$) and ferric tosylate ($Fe(OTs)_3$).

These oxidizing compounds, when used to obtain electrically conductive-polymer compositions, have the disadvantage of comprising metal atoms, a fact which renders their use incompatible with the application of the conductive polymer compositions as photosensitive resins in photolithographic processes. In fact, the presence of metal ions such as boron, phosphorus, iron, arsenic, antimony and gold, for example, threatens to contaminate the various constituents of circuits manufactured from photosensitive resins, including conductive polymers doped with these oxidizing compounds, and therefore to interfere with their electronic properties.

Moreover, the majority of the conductive polymer compositions doped with the above oxidizing compounds show little resistance to aging; in other words, the conductivity of conductive films produced from such conductive polymer compositions decreases rapidly over time. This phenomenon is intensified under the effect of temperature and humidity.

The article titled "Stability studies of the electrical conductivity of various poly(3-alkylthiophenes)" by Y. Wang and M. F. Rubner in Synthetic Metals 39 (1990), pages 153–175, examines more particularly the thermal stability of various poly(3-alkylthiophenes) doped with $FeCl_3$, $Fe(OTs)_3$ and $NOPF_6$. This article mentions that the best thermal stability is obtained by using $FeCl_3$ as oxidizing compound for doping polymers. Moreover, this article mentions that tests aimed at introducing the tosylate anion electrochemically, by using a purely organic compound, namely $Bu_4NOTs$, proved fruitless.

The article titled "Photoimaging of Electronically Polymeric Networks" by M. S. A Abdou, G. A. Diaz-Guijada, M. J. Arroyo and S. Holdcroft in Chem. Mater 1991, 3, pages 1003–1006, describes the doping of poly(3-hexylthiophene) with a solution of nitrosyl tetrafluoroborate in acetonitrile. This article also mentions that the polymer thus doped undergoes a marked loss in its conductivity after 30 minutes of atmospheric exposure.

The article "Conducting polymers as Deep-UV electron-beam resist: Direct production of Micrometer Scale conducting Structures from poly(3-octylthiophene)" by S. X. Cai, J. F. W. Keana, J. C. Nabity and M. N. Wybourne, Journal of Molecular Electronics, Vol 7, 1991, pages 63–68 describes the crosslinking of poly(3-octylthiophene) doped with $FeCl_3$ with the aid of ethylenebis (4-azido-2,3,5,6-tetrafluorobenzoate) under the action of deep UV radiation. This polymer can be used as a negative resist in deep UV. It can be used for direct production of conductive structures on the micrometer scale by using electron beam lithography.

The article titled "Laser, direct-write microlithography of soluble thiophenes" by M. S. A. Abdou, Z. W. Xie, A. M. Leung and S. Holdcroft, Synthetic Metals, 52 (1992) pages 159–170 describes the production of polymer "wires" by a conventional semiconductor photolithography process using, for the production of the "wires", a film of poly(3-hexylthiophene) which is irradiated through a mask by ultraviolet or visible light. The nonirradiated areas of the film are removed by dissolution in an organic solvent, and the remaining polymer is subsequently oxidized with nitrosyl tetrafluoroborate or ferric chloride in order to obtain an electronically conductive pattern.

The article titled "Microlithography using conducting polymers" by J. Bargon, T. Weidenbrück and T. Ueno, SPIE Vol 1262, (1990) pages 565–568 describes lithographically structured, electrically conductive polymers which comprise polythiophenes and polypyrrole derivatives doped with $FeCl_3$, $Fe(ClO_4)_3$, $Fe(NO_3)_3$, $NH_4Ce(NO_3)_5$, $FeBR_3$ [sic] and peroxides.

Finally, the article titled "Oxidation of $\pi$-conjugated polymers with gold trichloride: enhanced stability of the electronically conducting state and electroless deposition of $Au^{0*}$" by M. S. A. Abdou and S. Holdcroft, Synthetic Metals, 60 (1993) pages 93–96, describes the oxidizing doping of poly(3-hexylthiophene) by means of a solution of $AuCl_3$ in acetonitrile or nitromethane. The conductive polymers obtained are of high stability, especially in comparison with polymers doped with $FeCl_3$.

Patent Application CA-2 070 043 also describes the doping of inherently conductive polymers with metal salts and recommends the use of $AuCl_3$ as dopant.

Patent Applications WO-8 700 677 and EP-540 448 describe the doping of conductive polymers with $FeCl_3$ or else compounds containing the $FeCl_4$ anion.

As indicated above, the introduction of metal atoms into the conductive polymer or copolymer by the oxidizing compounds used for the doping of these conductive polymers or copolymers renders the resulting conductive polymers or copolymers incompatible with their use as photosensitive resins in lithography. In addition, apart from the polythiophene doped with $AuCl_3$, the conductive polymers obtained are of low stability, especially under the effect of temperature and humidity.

SUMMARY OF THE INVENTION

The object of the present invention is therefore to obtain conductive polymer compositions which do not contain metal ions, and which are stable, especially when subjected to the action of temperature and/or humidity.

Another object of the invention is a process for the production of such conductive polymer compositions.

A further object of the invention is to produce substrates coated with a film of these conductive polymer compositions.

Finally, yet another object of the invention is to provide an oxidizing solution for the doping of conductive polymer compositions, comprising as strong oxidizing agent an entirely organic compound; in other words, not containing a metal atom.

According to the present invention, novel conductive polymer compositions are provided which are stable and comprise at least one inherently conductive polymer or copolymer chosen from poly(thiophenes), polypyrroles, polyacetylenes, polyphenylenes, polythiophene copolymers, polypyrrole copolymers and water-soluble derivatives thereof, which polymer or copolymer is doped with an oxidizing compound chosen from the compounds of formulae:

$$R-NO \text{ and } R-NO_2,$$

in which R represents a group $HSO_4$, $R^1SO_3$, or $(R^1SO_2)_2N$, where $R^1$ is chosen from linear or branched alkyl radicals having 1 to 10 carbon atoms, preferably 1 to 4 carbon atoms, and fluoroalkyl radicals in which the linear or branched alkyl group comprises 1 to 10 carbon atoms, preferably 1 to 4 carbon atoms.

DETAILED DESCRIPTION OF THE INVENTION

The inherently conductive polymers and copolymers which can be used in the present invention are known compounds and are described inter alia in the articles and patent applications mentioned above.

Among the poly(thiophenes) and their water-soluble derivatives which are particularly useful in the present invention, mention may be made of poly(3-alkylthiophenes), poly(3-arylalkylthiophenes), poly(3-alkoxythiophenes) and poly(thiophene-3-alkylsulfonates) and poly(thiophene-3-alkylcarboxylates). Very particular recommendation is given to using poly(3-alkylthiophenes) and, in particular, poly(3-butylthiophene), poly(3-hexylthiophene), poly(3-octylthiophene) and poly(3-octadecylthiophene). The use of poly(3-octylthiophene) is recommended very particularly.

Among poly(thiophene-3-alkylsulfonates), poly(thiophene-3-ethylsulfonate) and poly(thiophene-3-butylsulfonate) are recommended.

Among poly (3- alkoxythiophenes), poly(3-methoxythiophene) and poly(3-ethoxythiophene) are recommended.

Among the polypyrroles which can be used in the present invention, mention may be made of poly(3-alkylpyrroles), poly(pyrrole-3-alkylsulfonates) and poly(3-alkoxypyrroles). Among poly(3-alkylpyrroles), poly(3-methylpyrrole), poly (3-ethylpyrrole), poly(3-octylpyrrole) and poly(3-undecanoylpyrrole) are recommended.

Among poly(pyrrole-3-alkylsulfonates), poly(pyrrole-3-ethylsulfonate) and poly(pyrrole-3-butylsulfonate) are recommended.

Among poly(3-alkoxypyrroles), poly(3-methoxypyrrole) and poly(3-ethoxypyrrole) are recommended.

Among water-soluble polyacetylene derivatives, polyacetylenes substituted by quaternary ammoniums are recommended.

The inherently conductive polymer which is particularly recommended in the present invention is poly(3-octylthiophene).

Among the polyphenylenes, mention may be made of poly(alkylphenylenes), poly(carboxyphenylenes, poly(alkylphenylene-vinylenes) and poly(alkoxyphenylenes).

Among the inherently conductive copolymers which can be used in the present invention, mention may be made of poly(methyl methacrylate)-poly(thiophene) copolymers and poly(pyrrole-alkylsulfonate)-polypyrrole polymers.

The conductive polymer compositions according to the invention can also contain other polymers and/or photosensitive resins.

Among the polymers which can be included in the conductive polymer compositions according to the invention, mention may be made of poly(vinyl acetates), poly(vinyl chlorides), polycarbonates, poly(methyl methacrylates), polyimides, polyvinyl alcohols, poly-acrylonitriles, poly(vinyl butyrals), poly(vinylidene chlorides), polystyrenes, poly(vinyl ethers), phenolic resins and polyurethanes. The polymers recommended are poly(vinyl chlorides) and poly(vinyl acetates).

Among the photosensitive resins which can be incorporated into the conductive polymer compositions in the present invention, recommendation is given to novolak resins comprising a photosensitive compound, for example a molecule of the diazonaphthoquinone type, and resins of poly(hydroxystyrene) and poly(vinylphenol) which are photosensitized with onium salts or sulfonium salts, such as diaryliodonium salts and triarylsulfonium salts, as is well known in the art.

The quantity of polymer or photosensitive resin, other than the inherently conductive polymer or copolymer, which can be incorporated into the compositions according to the invention may vary within wide limits and is preferably between 70 and 97% by weight, relative to the total weight of the composition.

The oxidizing compounds which make it possible to obtain stable doping of the inherently conductive polymers according to the present invention are compounds of the nitrosyl $(NO)^+$ type or nitryl $(NO_2)^+$ type which are entirely organic and correspond to the general formulae:

$$R-NO \text{ and } R-NO_2$$

in which R is as defined above.

R is preferably a group $HSO_4$, $CH_3SO_3$, $CF_3SO_3$ or $(CF_3SO_2)_2N$. Oxidizing compounds which are particularly recommended in the present invention are $HSO_4NO$, $CF_3SO_3NO$ (nitrosyl trifluoromethylsulfonate) and $(CF_3SO_2)_2N-NO$ (nitrosyl bis(trifluoromethylsulfonyl) imide). A very particularly recommended oxidizing compound is nitrosyl bis(trifluoromethylsulfonyl)imide.

These compounds are known compounds and they can be prepared in accordance with conventional methods.

The preparation of nitrosyl trifluoromethane is described inter alia by Umemoto et al. in Bull. Chem. Soc. Jpn. (83) pages 631–2; vol. 56; no. 2.

Weiss et al. describe nitrosyl salts and their preparations in Chem. Ber; (84) P 1973–6; Vol 117; no. 5.

Nitrosyl bis(trifluoromethylsulfonyl)imides or nitryl bis(trifluoromethylsulfonyl)imides and their preparations are described by Foropoulos et al. in Inorg. Chem. 1984, 23, 3720–3723.

Nitryl trifluoromethanesulfonate is described, along with its preparation process, in the U.S. Pat. No. 4,615,842.

The conductive polymer compositions according to the invention are obtained by bringing a composition comprising at least one inherently conductive polymer or copolymer, or a mixture of at least one inherently conductive polymer or copolymer with another polymer and or a photosensitive resin, into contact with a solution, in a suitable solvent, of one or more nitrosyl compounds or nitryl compounds according to the invention.

Preferably, the composition comprising the inherently conductive polymer or copolymer is brought into contact by immersion with the solution of oxidizing compound to form a film deposited on a substrate.

The solvents which are suitable for the preparation of the oxidizing solutions of nitrosyl compound or nitryl compound according to the invention are liquid aprotic polar solvents such as esters, for example propylene carbonate or ethylene carbonate and butyrolactone, nitrites, for example acetonitrile and benzonitrile, nitro derivatives, for example nitromethane and nitrobenzene, sulfones, for example sulfolane, and amides, for example dimethylformamide and N-methylpyrrolidone.

The concentration of nitrosyl compound or nitryl compound in the oxidizing solutions according to the present invention is generally between $10^{-4}$ and 1 mol per liter.

The contact time with the oxidizing solution is generally between 10 seconds and 1 hour, preferably between 30 seconds and 15 minutes, and depends on the desired doping and on the concentration of oxidizing compound in the oxidizing solution.

Preferably, after contact with the oxidizing solution, the conductive polymer composition obtained is rinsed, generally using the same solvents as those used for the oxidizing solution. After rinsing, the conductive polymer composition is then generally dried in air at room temperature or in an oven or alternatively on a hotplate, preferably at a temperature of between 60° C. and 120° C. for a period from 3 to 5 minutes.

In a preferred embodiment of the process of the invention, the polymer composition, which comprises at least one inherently conductive polymer or copolymer and, if appropriate, other polymers and/or a photosensitive resin, is deposited from a solution in an appropriate solvent onto the surface of a substrate in order to form a polymer film having a thickness of between 0.1 and 10 micrometers. The deposition of such a film on the surface of a substrate can advantageously be carried out by spin coating (spin-on technique) as is well known.

The plates (substrates+polymer film) obtained are then immersed in the oxidizing solutions according to the invention for the period required to obtain the desired doping of the polymer film. As before, the plates are then rinsed, generally using the same solvents as for the solution of oxidizing compound. Subsequently, these plates undergo final drying either in air at room temperature or in an oven or alternatively on a hotplate.

The recommended substrates are glass, quartz, silicon and silica.

The use of the oxidizing solutions according to the invention for the preparation of conductive polymer compositions in the form of a film on a substrate has the advantage of avoiding any risk of pollution of the conductive film by metal atoms such as B, P, S, Sb, Au and makes it possible to obtain films of conductive polymer composition whose electrical properties are stable even when they are subjected to relatively high temperatures or to a relatively aggressive environment, such as a humid atmosphere.

EXAMPLES 1 to 5

A 4% by weight solution of poly(3-octylthiophene) in toluene is prepared. The initial conductivity of the poly(3-octylthiophene) is of the order of $10^{-8}$ S/cm. From this solution, substrates consisting of silicon wafers covered with a 0.5 μm thick silica layer are spin-coated with poly(3-octylthiophene) films having a thickness of between 0.2 and 0.3 μm. The film-coated substrates are dried on hotplates for a total time of 3 minutes comprising 1 minute at 60° C., 1 minute at 80° C. and 1 minute at 100° C. The substrates coated with the film of polymer are subsequently immersed in various oxidizing solutions according to the invention, then dried on hotplates. The conductivity of the resulting films of conductive polymer composition is measured by the four-point method. The composition of the oxidizing solutions used, the duration of doping, and the result of the conductivity measurement are given in Table 1 below.

TABLE I

| | Oxidizing solution | | | Period of | Conductivity |
|---|---|---|---|---|---|
| Example No. | Oxidizing compound | Solvent | Concentration (mol/liter) | immersion (minutes) | measured (S/cm) |
| 1 | $CF_3SO_3$—NO | nitromethane | $10^{-2}$ | 1 | 10 |
| 2 | $HSO_4$—NO* | acetonitrile | saturated | 10 | 5 |
| 3 | $(CF_3SO_2)_2N$—NO | nitromethane | $3.10^{-3}$ | 2 | $10^{-2}$ |
| 4 | $(CF_3SO_2)_2N$—NO | nitromethane | $3.10^{-2}$ | 1 | 10 |
| 5 | $(CF_3SO_2)_2N$—NO | nitromethane | $5.10^{-3}$ | 1 | 20 |

*product marketed by Fluka

The results obtained show that the conductivities measured are of the same order of magnitude as those obtained with conventional metal oxidizing solutions ($FeCl_3$ or $AuCl_3$) for equivalent concentrations and solvents.

The coated substrate of Example 4 was subjected to a stability test at room temperature. The results of this test are shown in FIG. 1, where the conductivity of the conductive polymer film was measured as a function of time. For the purposes of comparison, FIG. 1 also shows conductivity as a function of time, under the same conditions, for a similar substrate coated with similar films of poly(3-octylthiophene) but doped with a solution of $FeCl_3$ in acetonitrile and a solution of nitrosyl tetrafluoroborate in nitromethane, respectively.

The coated substrate of Example 5 according to the present invention was also subjected to an aging test in a humid atmosphere. The test was carried out in an oven at 25° C. and at 90% relative humidity, and the conductivity of the polymer film was measured as a function of time. The results of this test are shown in FIG. 3.

This figure also shows the results for a substrate coated with a similar polymer film but doped under similar conditions with a solution of $AuCl_3$ in nitromethane. FIG. 3 shows that the substrate coated with the conductive polymer film according to the invention has a stability which is comparable with that of a conductive polymer film doped with $AuCl_3$.

Figure 1:
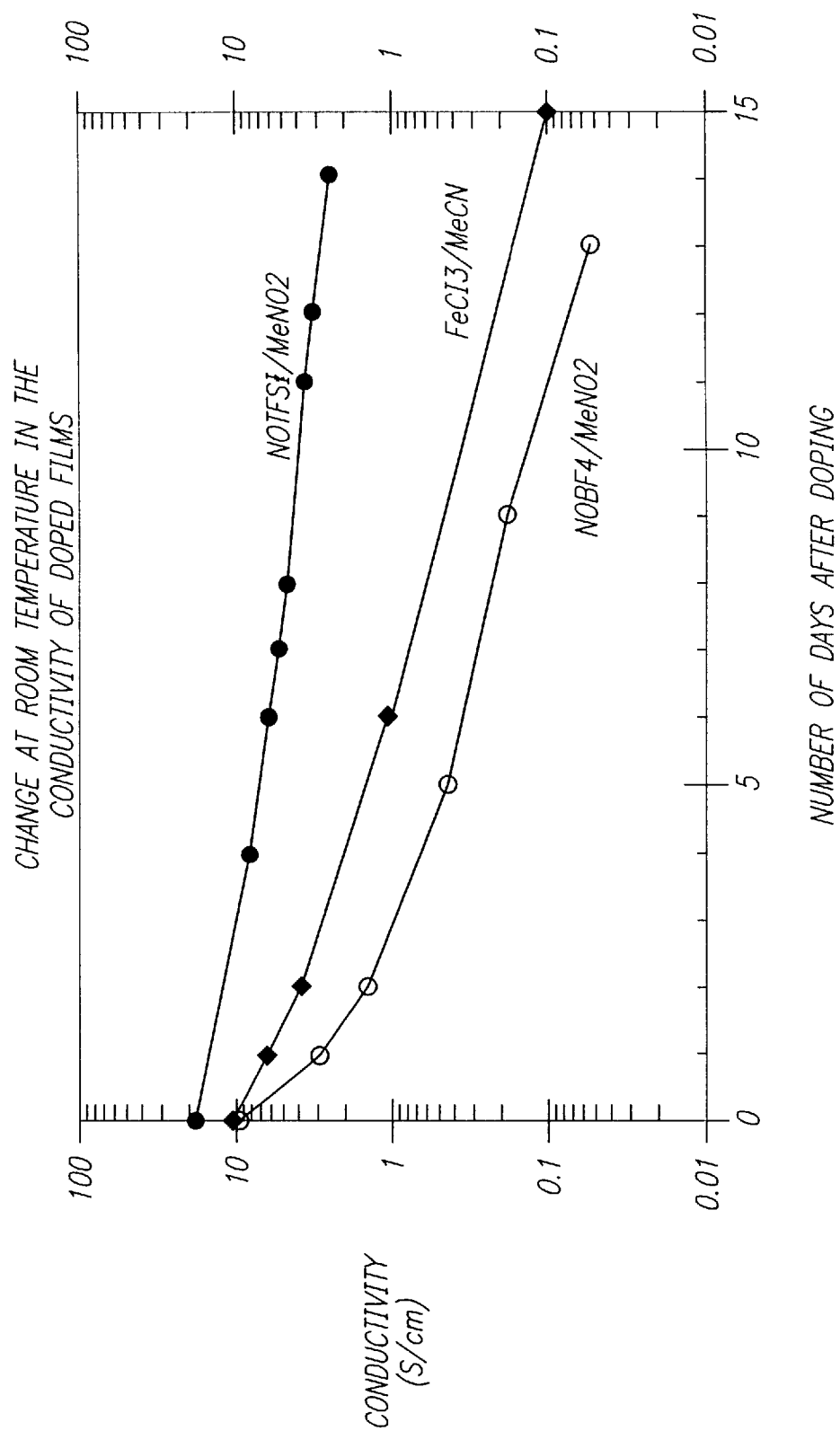
FIG. 1 clearly shows that, in this test, the polymer film doped with the oxidizing solution according to the invention has a better stability over time than similar polymer films doped with solutions of $FeCl_3$ and $NOBF_4$.
Figure 2:
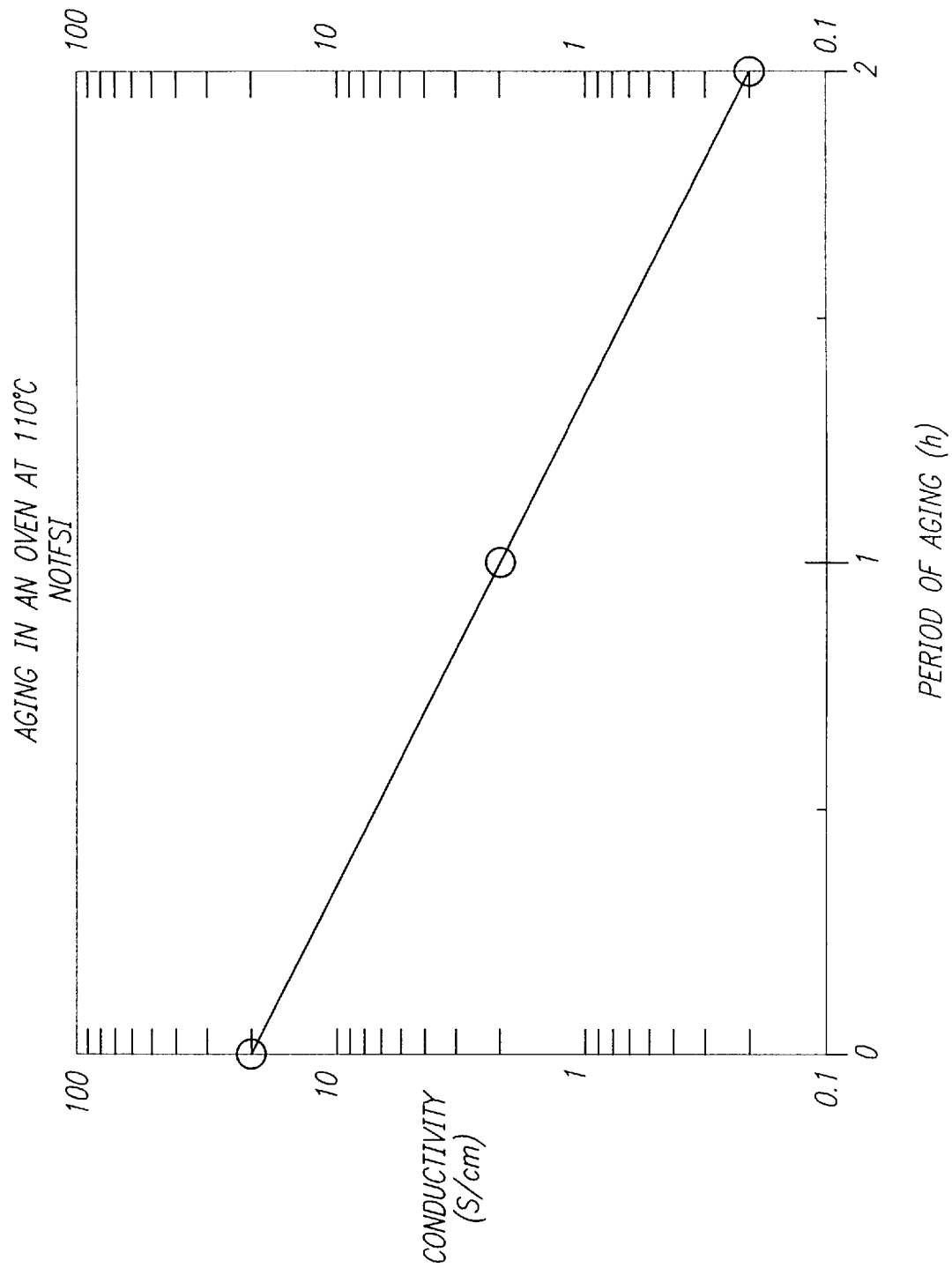
FIG. 2 is a graph of the conductivity as a function of time of the film of Example 4 when subjected to an aging test in an oven at 110° C.
Figure 3:
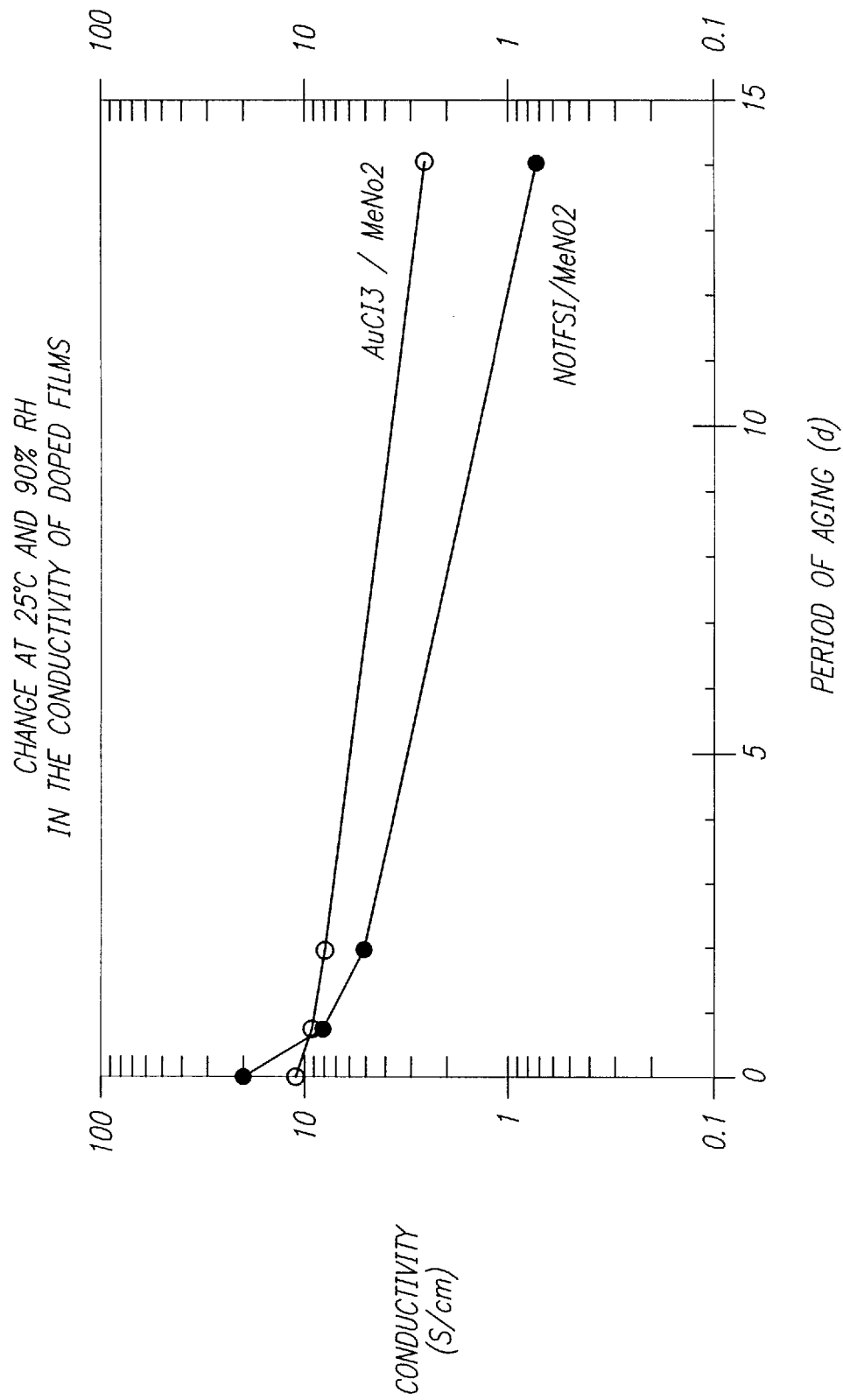
FIG. 3 clearly shows the excellent thermal aging stability of the film of polymer composition according to the invention.

In FIGS. 1 to 3, NOTFSI represents nitrosyl bis(trifluoromethylsulfonyl)imide.

The present invention thus makes it possible to obtain films of conductive polymer compositions having conductivities which are comparable with those of known conductive polymer films, having a stability at room temperature and in a humid atmosphere which is at least comparable with that of the films doped with $AuCl_3$, and having the advantages of not comprising metal atoms, a fact which makes them particularly useful for application in microelectronics.

We claim:

1. Electroconductive polymer composition free of metal ions comprising at least one inherently conductive polymer or copolymer selected from polythiophenes, polypyrroles, polyacetylenes, polyphenylenes, polythiophene copolymers, polypyrrole copolymers and their water-soluble derivatives, wherein the inherently conductive polymer or copolymer is doped with an oxidizing compound of formula:

$$(R^1SO_2)_2N\text{—}NO$$

in which $R^1$ is selected from the group consisting of linear or branched alkyl radicals having 1 to 10 carbon atoms, and linear or branched fluoroalkyl radicals having 1 to 10 carbon atoms.

2. A composition according to claim 1, wherein $R^1$ is $CF_3$—.

3. A composition according to claim 1, further comprising at least one polymer or resin selected from the group consisting of poly(vinyl acetates), poly(vinyl chlorides), poly(methyl methacrylates), polycarbonates, polyimides, polyvinyl alcohols, poly(acrylonitriles), poly(vinyl butyrals), poly(vinylidene chlorides), polystyrenes, poly(vinyl ethers), phenolic resins, polyurethanes and photosensitive resins.

4. A composition according to claim 1, wherein the inherently conductive polymer or copolymer is selected from the group consisting of poly(3-alkylthiophenes), poly(thiophene-3-alkylsulfonates), poly(thiophene-3-alkylcarboxylates), poly(3-alkoxythiophenes), poly(3-arylalkylthiophenes), poly(3-alkylpyrroles), poly(pyrrole3-alkylsulfonates), poly(3-alkoxypyrroles), poly(alkylphenylenes), poly(carboxyphenylenes), poly(alkylphenylene-vinylenes), poly(alkoxyphenylenes), poly(thiophene)-poly(methylmethacrylate) copolymers and polypyrrole alkylsulfonate)-polypyrrole copolymers.

5. A composition according to claim 4, wherein the inherently conductive polymer is a poly(3-alkylthiophene).

6. A composition according to claim 5, wherein the poly(3-alkylthiophene) is selected from the group consisting of poly(3-butylthiophene), poly(3-hexylthiophene), poly(3-octylthiophene) and poly(3-octadecylthiophene).

7. An electroconductive polymer composition according to claim 1, wherein $R^1$ is selected from the group consisting of linear or branched alkyl radicals having 1 to 4 carbon atoms and linear or branched fluoroalkyl radicals having 1 to 4 carbon atoms.

8. A process for producing an electrically conductive polymer composition free of metal ions which comprises bringing a composition comprising at least one inherently conductive polymer or copolymer, selected from the group consisting of poly(thiophenes), polypyrroles, polyacetylenes, polyphenylenes, polythiophene copolymers, polypyrrole copolymers and their water-soluble derivatives, into contact with an oxidizing solution in an appropriate solvent of at least one oxidizing compound, wherein the oxidizing compound is of the general formula:

$$(R^1SO_2)_2N\text{—}NO$$

in which $R^1$ is selected from the group consisting of linear or branched alkyl radicals having 1 to 10 carbon atoms and linear or branched fluoroalkyl radicals having 1 to 10 carbon atoms.

9. A process according to claim 8, wherein $R^1$ is $CF_3$—.

10. A process according to claim 8, wherein the solvent is selected from the group consisting of esters, nitriles, nitro derivatives, sulfones and amides.

11. A process according to claim 8, wherein the concentration of the oxidizing compound in the solution is between $10^{-4}$ and 1 mol per liter.

12. A process according to claim 8, wherein the contact time of the polymer composition comprising at least one inherently conductive polymer with the oxidizing solution is between 10 seconds and 1 hour.

13. A process according to claim 8, wherein the polymer composition additionally comprises at least one polymer or resin selected from the group consisting of poly(vinyl acetates), poly(vinyl chlorides), poly(methyl methacrylates), polycarbonates, polyimides, polyvinyl alcohols, poly(acrylonitriles), poly(vinyl butyrals), poly(vinylidene chlorides), polystyrenes, poly(vinyl ethers), phenolic resins, polyurethanes and photosensitive resins.

14. A process according to claim 8, wherein $R^1$ is selected from the group consisting of linear or branched alkyl radicals having 1 to 4 carbon atoms and linear or branched fluoroalkyl radicals having 1 to 4 carbon atoms.

* * * * *